United States Patent
Kobayashi

(10) Patent No.: US 9,886,453 B2
(45) Date of Patent: Feb. 6, 2018

(54) APPARATUS FOR IDENTIFYING OUTPUT TARGET CONTENT, METHOD THEREOF, AND STORAGE MEDIUM

(71) Applicant: CANON KABUSHIKI KAISHA, Tokyo (JP)

(72) Inventor: Koji Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/934,753

(22) Filed: Jul. 3, 2013

(65) Prior Publication Data

US 2014/0013253 A1    Jan. 9, 2014

(30) Foreign Application Priority Data

Jul. 9, 2012  (JP) ................. 2012-153673

(51) Int. Cl.
G06F 3/0484   (2013.01)
G06Q 10/10    (2012.01)
G06F 17/30    (2006.01)

(52) U.S. Cl.
CPC ...... G06F 17/30265 (2013.01); G06F 3/0484 (2013.01); G06F 17/30044 (2013.01); G06Q 10/109 (2013.01)

(58) Field of Classification Search
CPC ......... G06F 17/30265; G06F 17/30274; G06F 17/30044; G06F 3/0484; G06Q 10/109
USPC ........................................ 715/722, 737, 963
See application file for complete search history.

(56) References Cited

U.S. PATENT DOCUMENTS

| | | | | |
|---|---|---|---|---|
| 7,325,198 B2* | 1/2008 | Adcock et al. | ............... | 715/722 |
| 7,415,662 B2* | 8/2008 | Rothmuller et al. | ......... | 715/200 |
| 7,636,733 B1* | 12/2009 | Rothmuller | ....... | G06F 17/30265 |
| | | | | 382/305 |
| 8,095,406 B2* | 1/2012 | Nakamura | ........ | G06F 17/30265 |
| | | | | 368/29 |
| 8,689,098 B2* | 4/2014 | Halliday et al. | ............... | 715/234 |
| 8,832,205 B2* | 9/2014 | Nelson et al. | ................ | 709/206 |
| 2010/0082624 A1* | 4/2010 | Martin et al. | ................. | 707/737 |
| 2011/0128825 A1* | 6/2011 | Tanaka | .................... | G06F 3/147 |
| | | | | 368/29 |

FOREIGN PATENT DOCUMENTS

| | | |
|---|---|---|
| JP | 2004-213631 A | 7/2004 |
| JP | 2006-120125 A | 5/2006 |
| JP | 2009-159072 A | 7/2009 |

* cited by examiner

*Primary Examiner* — Andrew Tank
(74) *Attorney, Agent, or Firm* — Canon USA, Inc. I.P. Division

(57) ABSTRACT

An apparatus according to the present invention includes an obtaining unit configured to obtain information for specifying an event corresponding to a predetermined period and a content corresponding to the event from a memory, and an specifying unit configured in a case a user designate the predetermined period, based on the information obtained by the obtaining unit, to specify the event corresponding to the predetermined period and specify the content corresponding to the specified event as an output target.

19 Claims, 16 Drawing Sheets

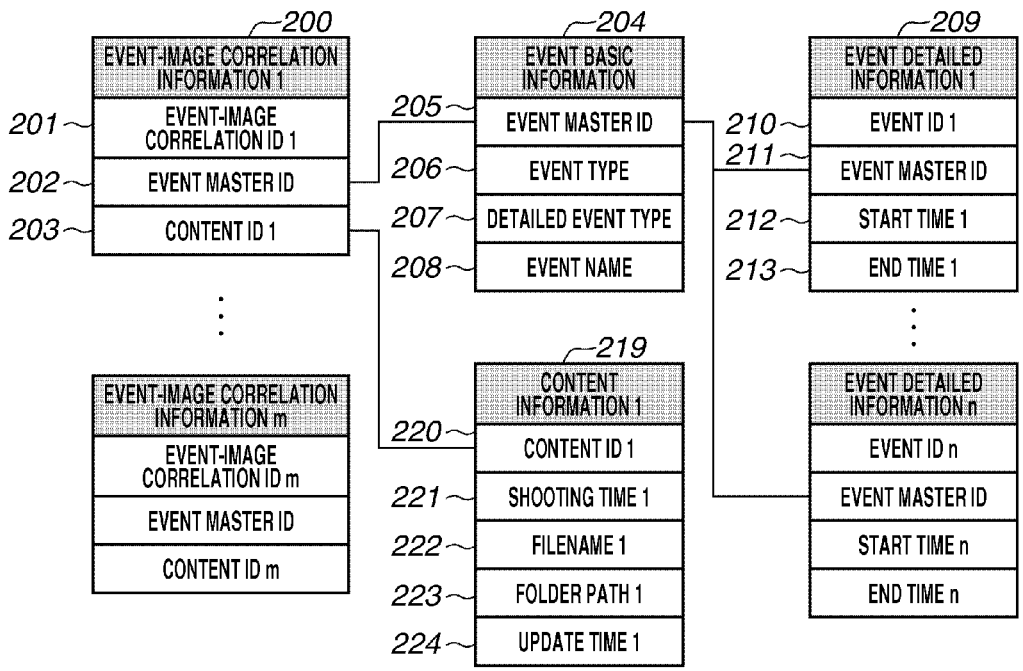
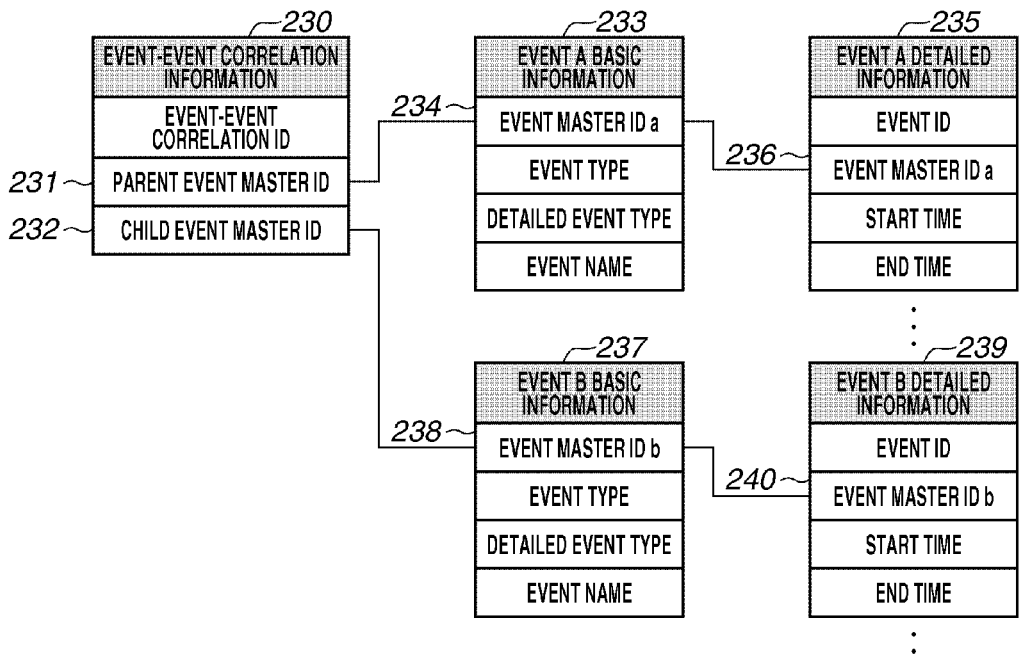

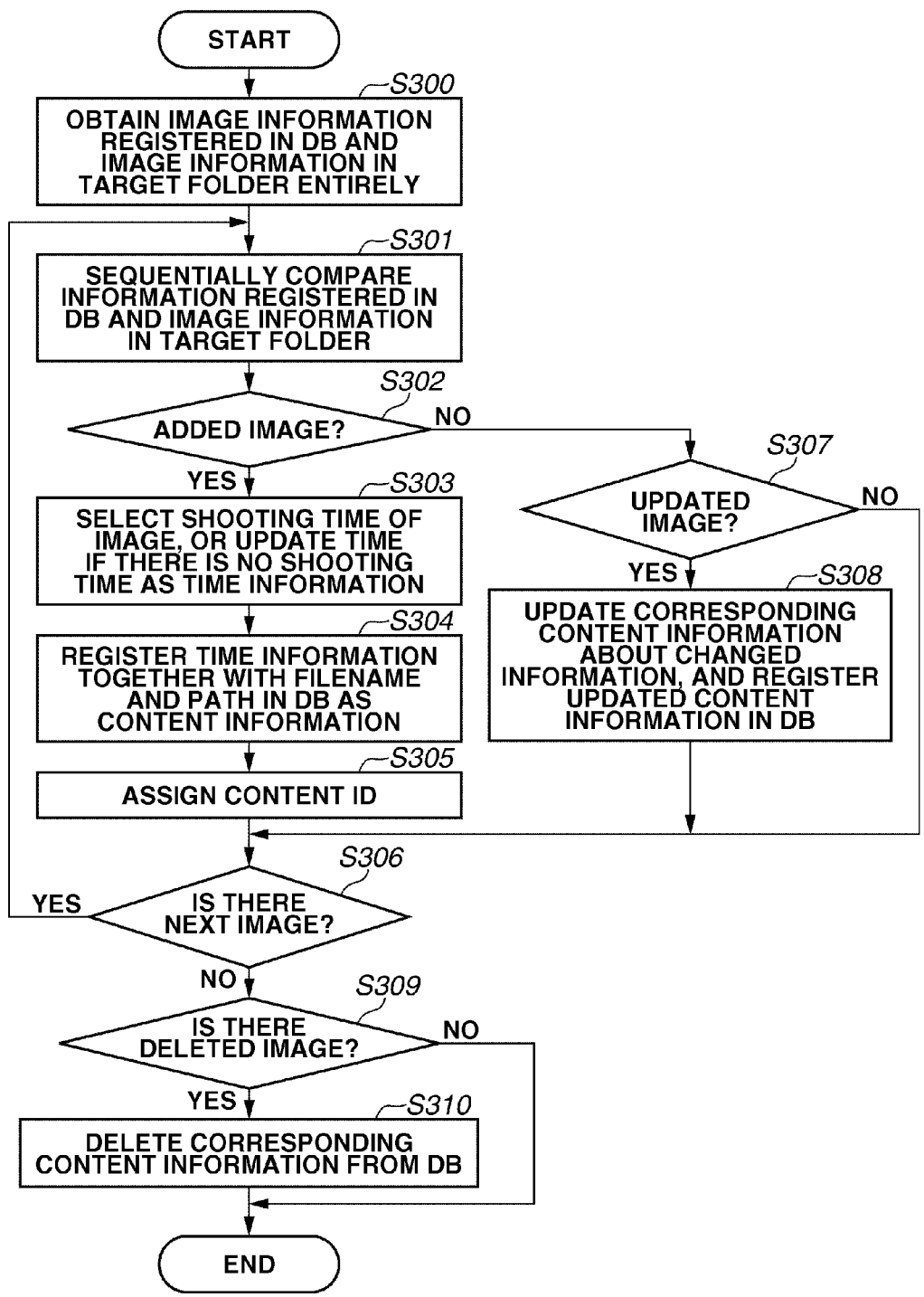

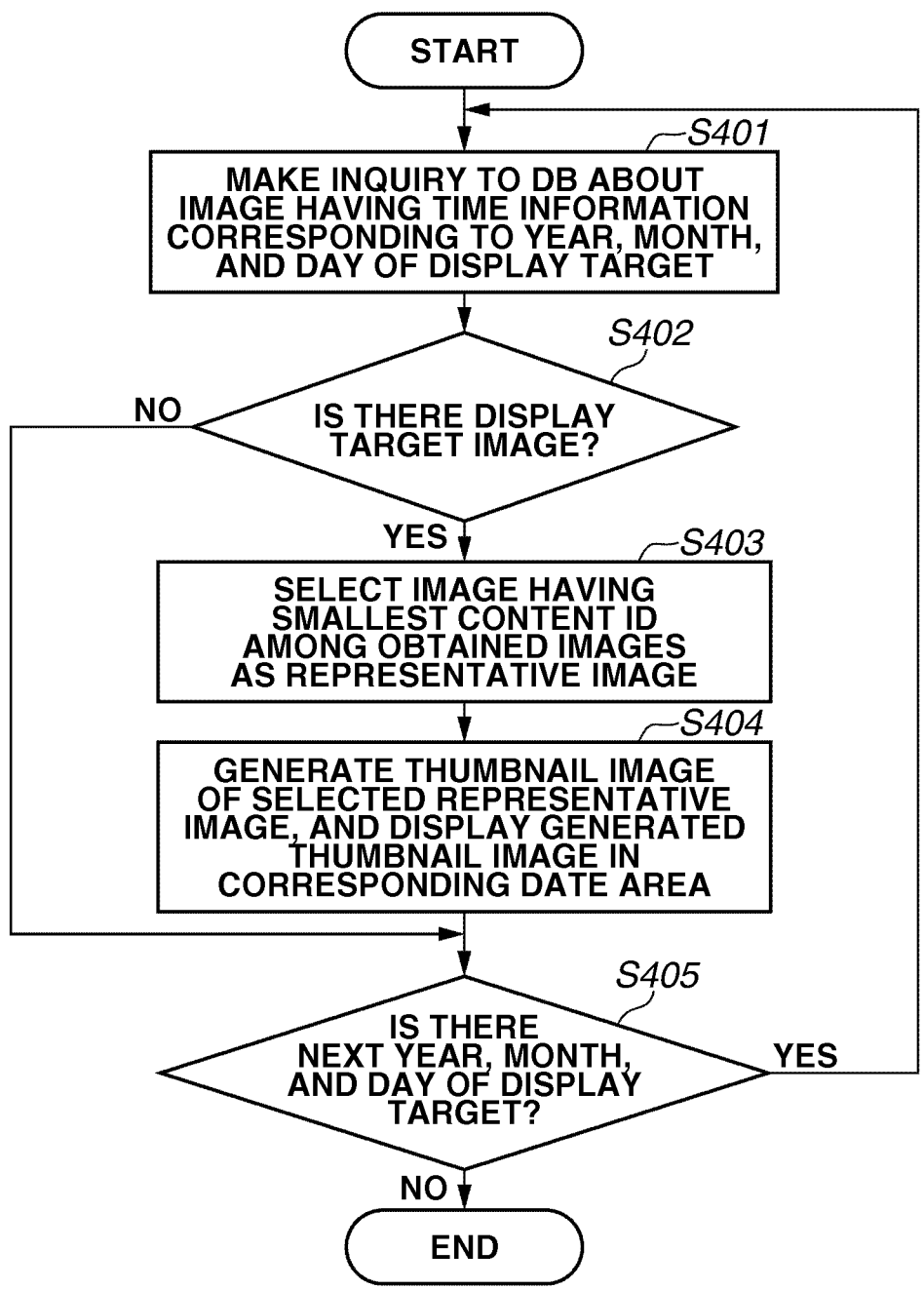

| APPLICATION | | | | | | | |
|---|---|---|---|---|---|---|---|
| CALENDAR | JULY 2008 | | | | | | |
| ▽EVENT | MONDAY | TUESDAY | WEDNESDAY | THURSDAY | FRIDAY | SATURDAY | SUNDAY |
| ▽ ☺ TRIP TO OKINAWA<br>  □ XX'S BIRTHDAY — 622<br>▽ ⚽ SOCCER CLASS<br>       623 | | 1 | 2 | 3 | 4 | 5 ☀ | 6 |
| | 7 | 8 | 9 | 10 | 11 ☺ | TRIP TO OKINAWA<br>XX'S BIRTHDAY □<br>12 — 620 | 13 ❀ SOCCER CLASS |
| | 14 | 15 | 16 | 17 | 18 | 19 | 20 ⚽ } 621 |
| | 21 | 22 | 23 | 24 | 25 | 26 | 27 ⚽ SOCCER CLASS |
| | 28 | 29 | 30 | 31 | | | |
| REGISTER EVENT | | | | | | | |

FIG.6C

DISPLAY OF EVENTS NOT IN
DEPENDENT RELATIONSHIP

| | TRIP TO OKINAWA | | 13 ❀ |
|---|---|---|---|
| ☺ 11 | XX'S BIRTHDAY □ 12 | | |

DISPLAY OF EVENTS IN
DEPENDENT RELATIONSHIP

| | TRIP TO OKINAWA | | 13 🛹 |
|---|---|---|---|
| 11 | ☺ XX'S BIRTHDAY □ 12 | | |

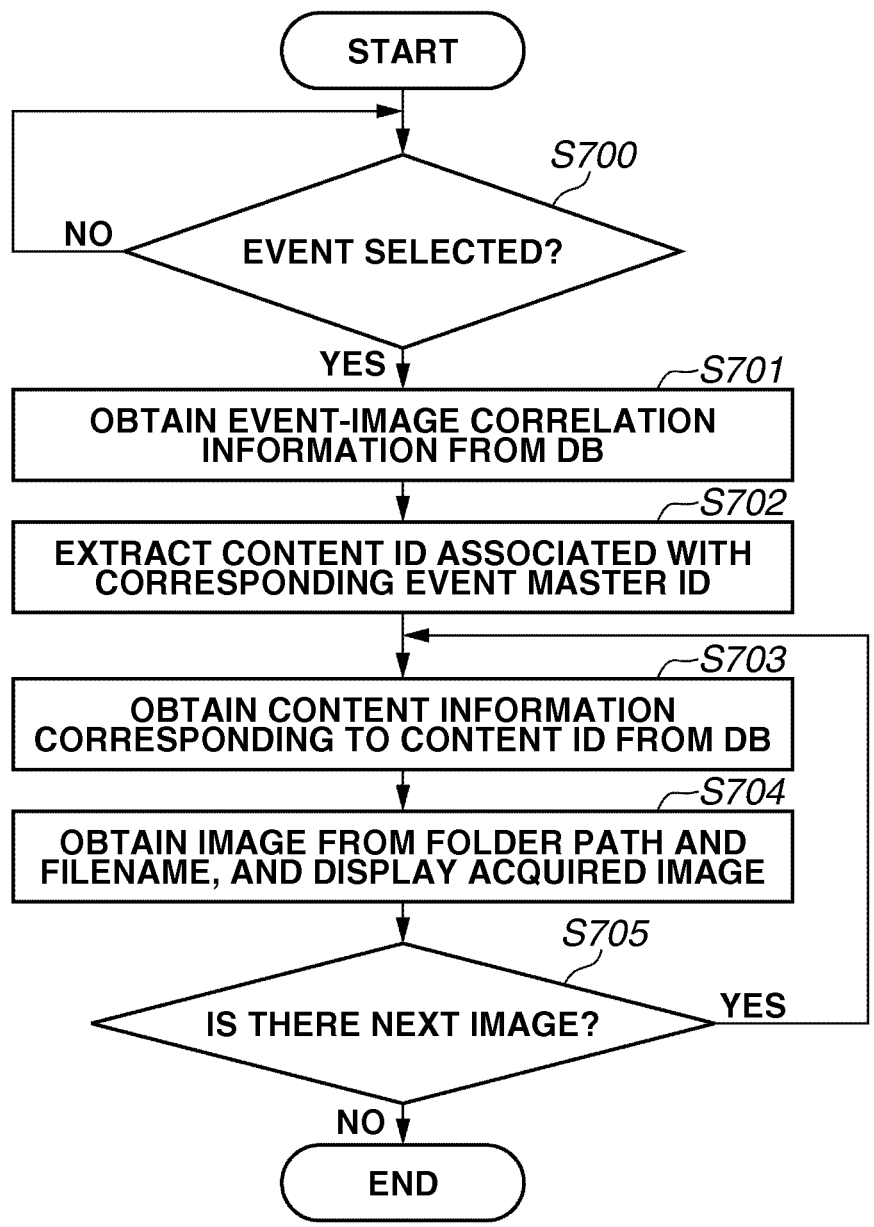

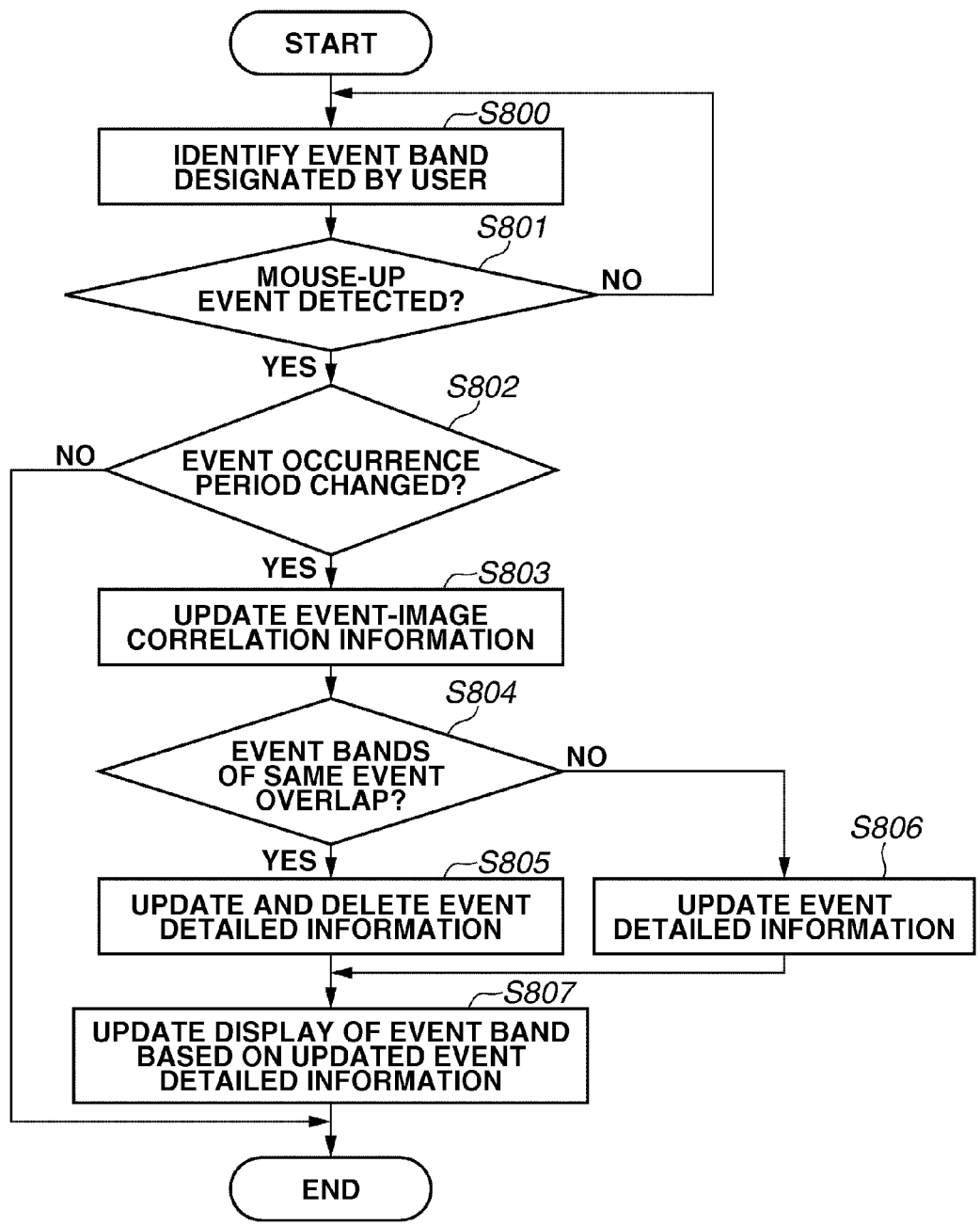

FIG.8B

| APPLICATION | | | | | | | |
|---|---|---|---|---|---|---|---|
| CALENDAR | JULY 2008 | | | | | | |
| ▽ EVENT | MONDAY | TUESDAY | WEDNESDAY | THURSDAY | FRIDAY | SATURDAY | SUNDAY |
| ▷ ☺ TRIP TO OKINAWA | | 1 | 2 | 3 | 4 | 5 ☀ | 6 |
| ▷ 📅 XX'S BIRTHDAY | 7 | 8 | 9 | 10 | 11 ☺ | 12 XX'S BIRTHDAY | 13 ⚽ SOCCER CLASS |
| ▷ ⚽ SOCCER CLASS | 14 | 15 | 16 | 17 | 18 | 19 | 20 ⚽ SOCCER CLASS |
| | 21 ⚽ | 22 ⚽ | 23 ⚽ | 24 ⚽ | 25 ⚽ | 26 ⚽ | 27 ⚽ |
| | 28 | 29 | 30 | 31 | | | |
| | REGISTER EVENT | | | | | | |

821, 822, 823, 820 (TRIP TO OKINAWA spans 4–12)

FIG.8C

| APPLICATION | | | | | | | |
|---|---|---|---|---|---|---|---|
| CALENDAR ▽EVENT ▷ ☺ TRIP TO OKINAWA ▷ 📖 XX'S BIRTHDAY ▷ ⚽ SOCCER CLASS | JULY 2008 | | | | | | |
| | MONDAY | TUESDAY | WEDNESDAY | THURSDAY | FRIDAY | SATURDAY | SUNDAY |
| | | 1 | 2 | 3 | 4 | 5 ☀ | 6 |
| | | | | | | TRIP TO OKINAWA | |
| | 7 | 8 | 9 | 10 | 11 ☺ | 12 XX'S BIRTHDAY 📖 | 13 SOCCER CLASS ⚽ — 823 |
| | 14 | 15 ⚽ | 16 SOCCER CLASS ⚽ — 820 | 17 | 18 ⇅ — 822 | 19 | 20 SOCCER CLASS ⚽ |
| | 21 ⚽ | 22 ⚽ | 23 ⚽ | 24 ⚽ | 25 ⚽ | 26 ⚽ | 27 |
| | 28 | 29 | 30 | 31 | | | |
| | REGISTER EVENT | | | | | | |

FIG.8D

| APPLICATION | | | | | | | |
|---|---|---|---|---|---|---|---|
| CALENDAR ▽EVENT ▷ ☺ TRIP TO OKINAWA ▷ 🎁 XX'S BIRTHDAY ▷ ⚽ SOCCER CLASS | JULY 2008 | | | | | | |
| | MONDAY | TUESDAY | WEDNESDAY | THURSDAY | FRIDAY | SATURDAY | SUNDAY |
| | | 1 | 2 | 3 | 4 | 5 ☀ | 6 |
| | 7 | 8 | 9 | 10 | 11 ☺ | 12 XX'S BIRTHDAY | 13 ✽ |
| | 14 | 15 | 16 | 17 SOCCER CLASS | 18 | 19 | 20 SOCCER CLASS |
| | 21 ⚽ | 22 ⚽ | 23 ⚽ | 24 ⚽ | 25 ⚽ | 26 ⚽ | 27 ⚽ |
| | 28 ⚽ | 29 | 30 | 31 | | | |
| | REGISTER EVENT | | | | | | |

| APPLICATION | | | | | | | |
|---|---|---|---|---|---|---|---|
| CALENDAR~443 | JULY 2008 | | | | | | |
| ▽EVENT | MONDAY | TUESDAY | WEDNESDAY | THURSDAY | FRIDAY | SATURDAY | SUNDAY |
| ▷ 😊 TRIP TO OKINAWA<br>▷ 🎂 XX'S BIRTHDAY<br>▷ ⚽ SOCCER CLASS | | 1 | 2 | 3 | 4 | 5 ☀ | 6 |
| | 7 | 8 | 9 | 10 | 11 😊 | ⟵ TRIP TO OKINAWA<br>12 🎂 XX'S BIRTHDAY | 13 ⚽ SOCCER CLASS |
| | 14 | 15 | 16 | 17 | 18 | 19 | 20 ⚽ SOCCER CLASS |
| | 21 | 22 | 23 | 24 | 25 | 26 | 27 |
| | 28 | 29 | 30 | 31 | | | |
| | REGISTER EVENT | | | | | | |

APPARATUS FOR IDENTIFYING OUTPUT TARGET CONTENT, METHOD THEREOF, AND STORAGE MEDIUM

BACKGROUND OF THE INVENTION

Field of the Invention

The present invention relates to an apparatus for identifying an output target content, a method thereof, and a storage medium.

Description of the Related Art

Conventionally, there has been known a technique for managing images by a date and outputting the images for each date.

Japanese Patent Application Laid-Open No. 2004-213631 discusses a technique, in a calendar display, for displaying a digital image associated with a date in a date field in a calendar, thereby providing an image associated with each date to a user. Further, Japanese Patent Application Laid-Open No. 2004-213631 discusses a technique in which this technique associates a digital image with an event registered by a user, and adds, to an image displayed in a date field in the calendar display, an event identifier indicating the event corresponding to the image.

However, the technique discussed in Japanese Patent Application Laid-Open No. 2004-213631 displays an image associated with a date. Therefore, even for a date when an event was held, this technique displays no event identifier unless there is an image associated with this date.

Therefore, even when a user wants to display an image of an event held on a specific date, no image may be displayed in the date field if no image was shot on this date, and the user may be unable to appropriately select the image of this event.

For example, assume a case that an event was continuously held on a plurality of dates, and no image was shot on a date that a user recognizes as the date when the event was held. In this case, even if an image was shot on another date of this event, the user may be unable to select this image.

Further, for example, when a user wants to display an image associated with an event that will be held at a future date from the current date, no image is shot at the future date from the current date, whereby no image and no event identifier are displayed in the date field of this date. Therefore, the user may be unable to appropriately know the date when the event will be held, and appropriately identify an image shot at this event.

SUMMARY OF THE INVENTION

The present invention is directed to an apparatus for appropriately identifying an output target content, a method thereof, and a storage medium.

According to an aspect of the present invention, an apparatus for identifying an output target content includes an obtaining unit configured to obtain information for specifying an event corresponding to a predetermined period and a content corresponding to the event from a memory, and a specifying unit configured in a case a user designate the predetermined period, based on the information obtained by the obtaining unit, to specify the event corresponding to the predetermined period and specify the content corresponding to the specified event as an output target.

Further features and aspects of the present invention will become apparent from the following description of exemplary embodiments with reference to the attached drawings.

BRIEF DESCRIPTION OF THE DRAWINGS

FIGS. 2A and 2B illustrate information stored in a database (DB) 109.

FIG. 3 is a flowchart illustrating a processing procedure for obtaining and updating content information of each image.

FIGS. 4A and 4B illustrate display control processing of a calendar view, and an example of the calendar view, respectively.

FIGS. 5A and 5B illustrate event registration processing.

FIGS. 6A, 6B, and 6C illustrate display control processing of event information, and a display screen on which the event information is displayed, respectively.

FIGS. 7A and 7B illustrate display control processing for displaying images corresponding to an event designated by a user, and a result of the display of the images corresponding to the event, respectively.

FIGS. 8A, 8B, 8C, and 8D illustrate processing for changing an event period.

FIG. 9 illustrates an example of the calendar view.

DESCRIPTION OF THE EMBODIMENTS

Hereinafter, an exemplary embodiment of the present invention will be described in detail with reference to the accompanying drawings. The following exemplary embodiment is not intended to limit the present invention according to the claims, and not all combinations of characteristics that will be described in the description of the present exemplary embodiment are essential for a solution of the present invention.

Figure 1:
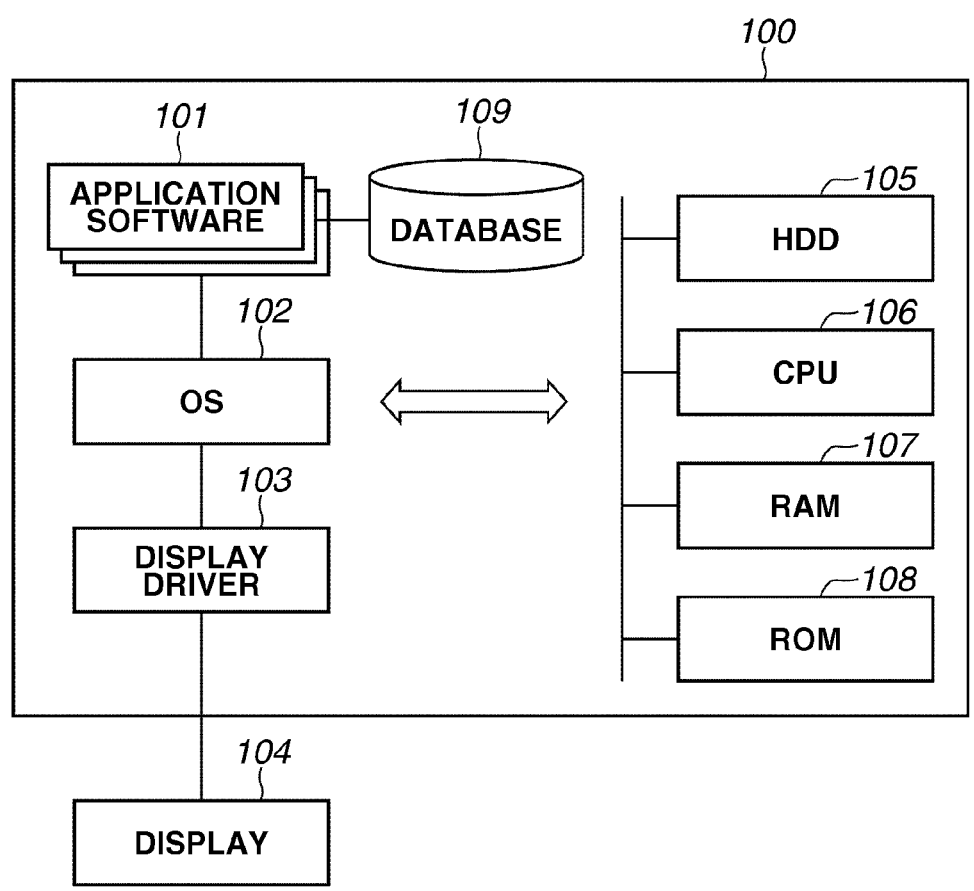
FIG. 1 is a block diagram illustrating a configuration of a host computer.

FIG. 1 is a block diagram illustrating the configuration of software and hardware of a host computer according to the present exemplary embodiment.

A host computer 100 includes an application 101, an operating system (OS) 102, and a display driver 103, as software. The application 101 is application software for displaying a calendar, and displaying an image in a date field allocated to each date in the calendar. Besides the application 101, the host computer 100 may also include applications such as a word processor, a spreadsheet, and an internet browser. The application 101 stores an image and event information, which will be described below, in a database (hereinafter referred to as the DB) 109 as a storage for storing information, and displays the image on the calendar based on the image and the event information. Further, the application 101 generates output target data (image data, text data, and graphics data). Then, the application 101 outputs the output target data to the display driver 103 via the operating system (herein after referred to as the OS) 102 together with various kinds of commands for displaying a display image based on this output target data. The display driver 103 displays the display image corresponding to the output target data on a display unit 104 connected to the host computer 100 according to the input commands.

Further, the host computer 100 includes hardware such as a central processing unit (CPU) 106, a hard disk drive (HDD) 105, a random access memory (RAM) 107, and a read-only memory (ROM) 108, to allow the above-described software to function. The programs of the above-described software such as the application 101 and the OS 102 are stored in the HDD 105 or the ROM 108.

Further, a not-illustrated operation device such as a mouse, a keyboard, and a touch panel is connected to the host computer 100 via wireless or wired communication. When a user operates this operation device, a user's instruction is input according to this operation. Then, the CPU 106 reads out the programs stored in the HDD 105 or the ROM 108 to the RAM 107 according to this instruction, and executes the programs with use of the RAM 107 as a work memory, thereby realizing the functions of the application 101 and the OS 102. The above-described DB 109 is allocated in the HDD 105.

Text data categorized as a text such as characters, graphics data categorized as graphics such as a figure, and image data categorized as a photo image or the like are generated on the host computer 100 by the application 101. Then, image data as an output target is generated based on this data, and the output image data is displayed on the display unit 104 by the display driver 103.

In the present exemplary embodiment, a plurality of images that is candidates for an output target is stored in the HDD 105. Further, event information associated with each of the plurality of images is stored in the DB 109. The event information contains correlation information indicating a correlation between an image and an event (for example, a birthday and a trip) associated with the image, and information indicating a period during which the event was held.

In the present exemplary embodiment, the application 101 displays an event band, which indicates a period corresponding to an event, on the calendar. Then, when a user designates an event period (an event band), the application 101 identifies the event corresponding to the specified event period, and displays an image corresponding to the identified event. According thereto, by designating a desired date on which an event was held, the user can cause an image shot at this event to be displayed. The details thereof will be described below.

FIGS. 2A and 2B illustrate information stored in the DB 109. This DB 109 is generated in the HDD 105 by the application 101.

Referring to FIG. 2A, correlation information 200 is information indicating an event corresponding to each image. If there is a plurality of images (1 to m), the correlation information 200 is generated for each of these images. When a user designates an event for each image, the CPU 106 generates the correlation information 200 based on information that the user inputs when designating the event.

A correlation information ID 201 is information for identifying the correlation information 200 corresponding to each image. An event master ID 202 is information for identifying an event registered by a user, and is a unique ID throughout the DB 109. A content ID 203 indicates a content such as an image corresponding to the event of the event master ID 202.

The above-described event master ID 202 indicates information of an event. Event basic information 204 associated with the event master ID 202 indicates information about the event. An event master ID 205 contained in the event basic information 204 is the same information as the above-described event master ID 202, and the event basic information 204 corresponding to the event correlation information 200 is identified by comparing these two event master IDs 202 and 205. The event basic information 204 further contains an event type 206 (for example, a "leisure"), which indicates the type of the event, and a detailed event type 207 (for example, a "trip"), which indicates the further detailed type of the event. The event basic information 204 further contains an event name 208 (for example, "TRIP TO OKINAWA) set by a user.

An event master ID 211 is the same information as the event master IDs 202 and 205. Event detailed information 209 is referred to by verifying the event master IDs 202, 205, and 211. The event detailed information 209 contains an event ID 210. This event ID 210 is provided to each of continuous periods set to the event.

Further, the event detailed information 209 contains a start time 212 and an end time 213, which indicate the occurrence period of the event. Therefore, for example, if the event is continuously held on a plurality of dates, the event detailed information 209 is generated in such a manner that the start time 212 and the end time 213 contain the plurality of dates.

Further, as illustrated in FIG. 2A, the event detailed information 209 is generated for each of event occurrence periods (1 to n) of the event. Therefore, event detailed information 209 corresponding to a plurality of discontinuous occurrence periods can be set for the same event basic information 204. For example, if a user designates an event held on a specific day of the week every week, the event detailed information 209 is generated for each of a plurality of dates corresponding to this day of the week. Then, different event IDs 210 are set to the common event master ID 211 for the discontinuous events.

If a user wants to register an event that does not have information of an occurrence period (for example, when the user wants to register the occurrence period of the event later), such a registration can be achieved by refraining from setting specific time information in the start time 212 and the end time 213.

Content information 219 contains a content ID 220, which is information for identifying a content such as an image. This content ID 220 is a unique ID throughout the DB 109. A shooting time 221, if the content is an image, indicates the time at which the image was shot. Especially, if the content is an image in the format of Exchangeable Image File Format (Exif), the shooting time 221 is obtained from shooting date information in the image file. If the image is not in the format of Exif, or if the content is a file that is not an image, the time at which the file was generated is contained in the content information 219. Further, the content information 219 contains a filename 222 and a folder path 223 of a content file, and an update time 224 of the file. The folder path 223 indicates the folder where the subject content is stored in the HDD 105. The CPU 106 can identify an output target content from these folder path 223 and filename 222.

The correlation information 200 is generated for each of the plurality of images (1 to m). At this time, even if the plurality of images corresponds to a same event (the plurality of pieces of correlation information 200 has a same event master ID 202), each correlation information piece 200 is associated with the same event basic information 204.

According to the above-described correlation information 200, it is possible to make an advance registration of an event having a periodic occurrence condition (for example, every Sunday), and the correlation information 200 is generated for each of the plurality of images (1 to m). Therefore, for example, when a content having time information that matches the time at which a periodic event occurs is added to the HDD 105, the content information 219 of this content is automatically associated with the event basic information 204 of this event. Then, the event detailed information 209 containing the time information of this content is automatically set to the event basic information 204. As a result, in a calendar view, the event band of the event is displayed on the date corresponding to the content in synchronization with the timing at which this content is added. The event band in the calendar view will be described in detail below.

FIG. 2B illustrates event-event correlation information. Event-event correlation information 230 indicates a dependent relationship between events. A parent event master ID 231 indicates the event master ID of an upper event among the event master IDs 202 defined in FIG. 2A. Similarly, a child event master ID 232 indicates the event master ID of a lower event. The CPU 106 refers to a subordinate relationship between events based on the event-event correlation information 230, and displays the events according to this dependent relationship. The details thereof will be described below.

This subordinate relationship is not set to all events, but is set to two events specified by a user. Therefore, if a user wants to set an event as an independent event that does not have a subordinate relationship, such setting can be realized by refraining from establishing an association between events through the event-event correlation information 230.

As illustrated in FIG. 2B, the parent event and the child event are associated with event A basic information 233 and event B basic information 237, respectively. This association is established therebetween by an event master ID a 234, which is the same information as the parent event master ID 231, and an event master ID b 238, which is the same information as the child event master ID 232.

Further, the event A basic information 233 and the event B basic information 237 are associated with event A detailed information 235 and event B detailed information 239, respectively. As illustrated in FIG. 2A, a plurality of pieces of event detailed information 209 can be set so as to correspond to a plurality of event occurrence periods.

In the present exemplary embodiment, as illustrated in FIGS. 2A and 2B, events and contents are managed with use of the DB 109, in which information is associated with other information based on the IDs of the events and contents. However, the present exemplary embodiment is not limited thereto, and can employ various kinds of information management methods. For example, the information may be managed in the format of Extensible Markup Language (XML).

FIG. 3 is a flowchart illustrating a processing procedure for obtaining and updating the content information 219 of each image. The purpose of this processing is to update the content information 219 stored in the DB 109 with use of the image information of an image that is a processing target. This processing is performed as a preparation for processing for displaying an image in the calendar view, which will be described below.

The processing of flowcharts illustrated in FIG. 3, and FIGS. 4A and 4B to 8A to 8D which will be described below can be realized by the CPU 106 executing the program of the application 101, which is stored in the ROM 108 or the HDD 105, on the RAM 107.

In step S300, the CPU 106 obtains image information that the application 101 causes the DB 109 to hold, and image information of a processing target image stored in a folder in the HDD 105. At this time, as the image information in the DB 109, the CPU 106 obtains all of the content information pieces 219 stored in the DB 109. Further, the CPU 109 obtains the image information of the processing target image from an image file stored in a specific folder. The folder from which the image information is obtained may be a folder designated by a user, or may be a folder automatically identified by the application 101. As the automatic identification of the folder, the application 101 may store the date and time of the last time that the image information was obtained, and may identify a folder updated after this date and time. This image information obtained in step S300 contains a shooting time, a filename, a folder path, and an update time.

In step S301, the application 101 compares the image information obtained from the DB 109 in step S300 and the image information directly obtained from the image file in step S300. This comparison in step S301 is sequentially performed for each of the image file(s).

In step S302, the application 101 determines whether the present processing target image is an added image as a result of the comparison in step S301. The added image here means an image added to a management target folder in the HDD 105 after the DB 109 was updated last time. As the determination in step S302, if the time information of the present processing target image is not stored in the DB 109, the application 101 determines that the image corresponding to this image information is an added image.

If the application 101 determines in step S302 that the present processing target is an added image (YES in step S302), the processing proceeds to step S303. In step S303, the application 101 sets the shooting time information contained in the image information of the present processing target or the update time of the file, as the time information. In a case where the image is an image in the Exif format, and the image information contains shooting time information, the application 101 sets this shooting time as the time information. In a case where the image information does not contain shooting time information, the application 101 sets the update time of the file as the time information.

In step S304, the application 101 registers the time information obtained in step S303 in the DB 108 together with the filename and the folder path as new content information 219. In step S305, the application 101 assigns a content information ID 220 to the content information 219 registered in step S304.

In step S306, the application 101 checks whether there is image information as a next processing target with its update state unchecked yet, among the image information piece(s) obtained in step S300. If there is a next processing target (YES in step S306), the processing proceeds to step S301 again, from which the application 101 continues the processing for updating the content information 219. If there is no next processing target (NO in step S306), the application 101 proceeds to step S309.

On the other hand, if the application 101 determines in step S302 that the present processing target image is not an added image (NO in step S302), the processing proceeds to step S307. In step S307, the application 101 determines whether the present processing target image is an updated image. The updated image here means an image updated after the DB 109 was updated last time. As the process in step S307, the application 101 determines that the image is updated, for example, if the update time contained in the image information of the image is a time after the time when the DB 109 was updated. If the application 101 determines in step S307 that the present processing target image is an updated image (YES in step S307), the processing proceeds to step S308. In step S308, the application 101 updates the content information 219 corresponding to the present processing target image with use of the update time of the updated image, and registers the updated content information 219 in the DB 109.

If the application 101 determines in step S307 that the present processing target image is not an updated image (NO in step S307), the processing proceeds to step S306, in which the application 101 determines whether there is an image that is a next processing target.

If the application 101 determines in step S306 that there is no image that is a next processing target (NO in step S306), i.e., if the application 101 determines that all of the image(s) corresponding to the image information obtained in step S300 have been processed already, the processing proceeds to step S309.

In step S309, the application 101 determines whether there is a deleted image. The deleted image here means an image deleted from the management target folder in the HDD 105 after the DB 109 was updated last time. As this determination, the application 101 identifies content information 219 that does not have an image corresponding thereto among all of the content information pieces 219 stored in the DB 109, which were obtained in step S300, and determines that the image corresponding to the identified content information 219 is a deleted image. The application 101 can determine whether there is an image corresponding to content information 219 by, for example, accessing the HDD 105 based on the folder path 223 and the filename 222 in the content information 219, and checking whether there is an image.

In step S310, the application 101 deletes the content information 219 corresponding to the deleted image identified in step S309 from the DB 109, and then ends the processing.

In this manner, according to the processing illustrated in FIG. 3, it is possible to update the content information 219 stored in the DB 109. The update processing illustrated in FIG. 3 is performed, for example, when the application 101 is activated. In this case, when a user causes the calendar view to be displayed with use of the application 101, the calendar view can be displayed based on the updated content information 219.

Figure 4B:
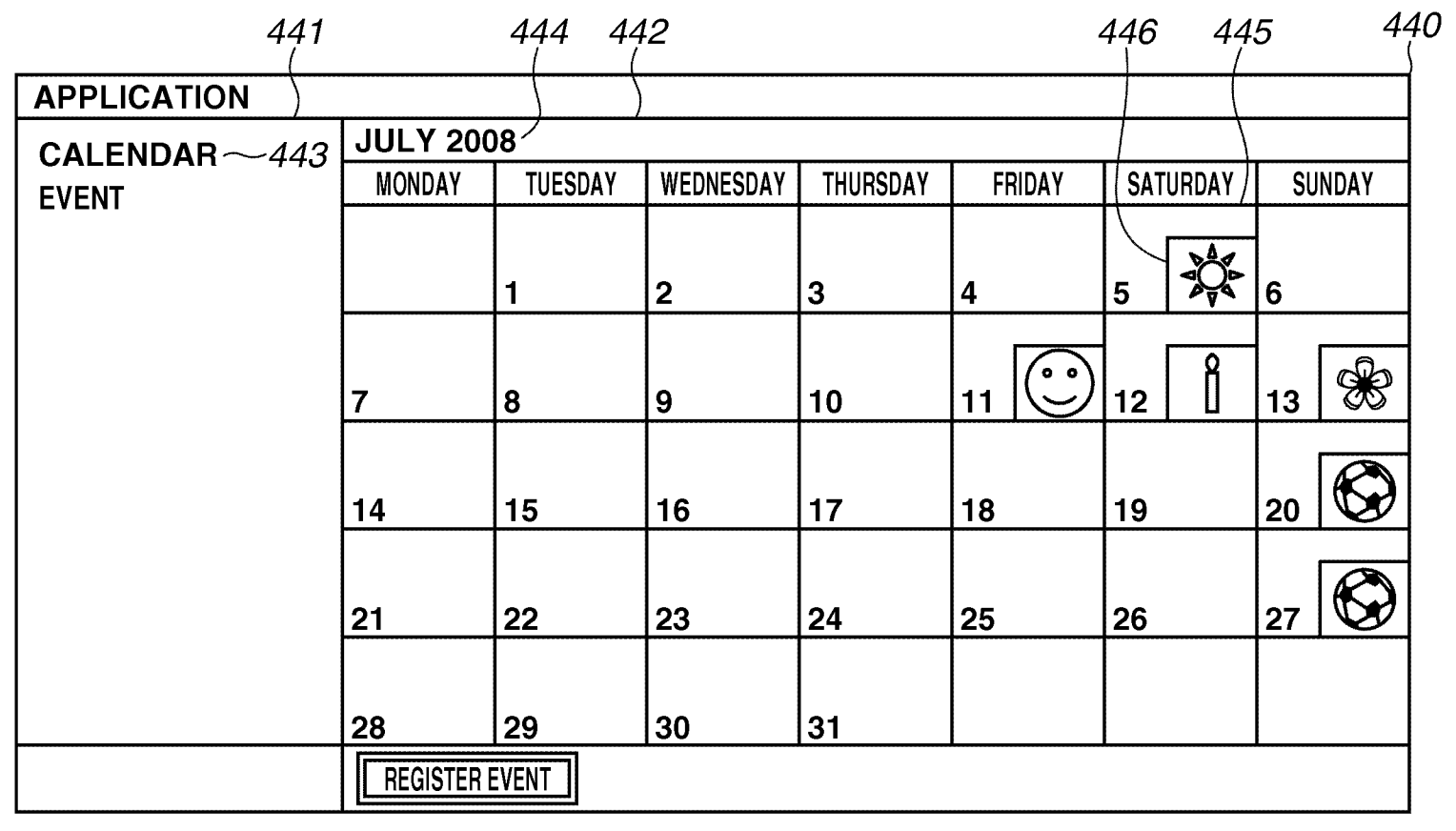

FIGS. 4A and 4B illustrate display control processing of the calendar view, and an example of the calendar view according to the present exemplary embodiment, respectively. The display control processing illustrated in FIGS. 4A and 4B is performed based on the DB 109 updated by the update processing illustrated in FIG. 3. FIG. 4A is a flowchart illustrating the display control processing by the application 101. The details thereof will be described below.

FIG. 4B illustrates a display screen displayed by the processing illustrated in FIG. 4A. This display screen includes a display area of a tree menu 441 for selecting a display mode of an image, and an image browsing area 442 in a window 440. When a user selects a calendar menu 443 on the tree menu 441, the application 101 displays a calendar view 444 for displaying images for each shooting date in the image browsing area 442.

In step S401 illustrated in FIG. 4A, the application 101 makes an inquiry to the DB 109 about whether there is an image corresponding to each date in a display target year and month. More specifically, the application 101 identifies a display target year, month, and day, and determines whether the time information of the content information 219 corresponds to the display target year, month, and day in the DB 109. Then, the application 101 selects an image corresponding to the display target year, month, and day as a display target image at this time. For example, the application 101 makes an inquiry to the DB 109 about an image having the time information (the shooting time, or the update time if there is no shooting time) of a date area 445 (Jul. 5, 2008).

In step S402, the application 101 determines whether there is a display target image corresponding to the present display target year, month, and day as a result of the inquiry in step S401. If there is a display target image (YES in step S402), the processing proceeds to step S403. If there is no display target image (NO in step S402), the processing proceeds to step S405.

In step S403, the application 101 selects a file having a smallest content ID 220 among the content information pieces 219 of all images corresponding to the present display target year, month, and day as a representative image.

In step S404, the application 101 displays a thumbnail image 446 of the representative image in the date area 445 based on the content information 219 of the representative image selected in step S403. More specifically, the application 101 accesses the representative image stored in the HDD 105 based on the folder path 223 and the filename 222 contained in the content information 219 of the representative image. In a case where a plurality of images having different numbers of pixels from one another is stored in the image file of the representative image, the application 101 obtains an image having a small number of pixels as the thumbnail image 446, and displays this thumbnail image 446. In a case where only one image is contained in the image file of the representative image, the application 101 generates the thumbnail image 446 by thinning pixels according to the number of pixels of this image, and displays the generated thumbnail image 446.

In step S405, the application 101 checks whether there is a next year, month, and day that is to be processed as a display target. In other words, the application 101 checks whether the processes of steps S401 to S404 have been performed on all of the date contained in the display target year and month. If the application 101 determines in step S405 that there is a next year, month, and day that is to be processed as a display target (YES in step S405), the processing proceeds to step S401 again. On the other hand, if the application 101 determines in step S405 that there is no next year, month, and day that is to be processed as a display target (NO in step S405), the application 101 ends the processing.

In this manner, according to the processing illustrated in FIGS. 4A and 4B, the application 101 displays images corresponding to the year and month set as a display target with the images assorted to the respective dates corresponding to these images. The display target year and month can be switched according to a switching instruction issued by a user. Then, it is possible to display images corresponding to the year and month to be newly displayed by performing the processing illustrated in FIG. 4A according to an input of the user's switching instruction.

Further, user's issue of an instruction on a "REGISTER EVENT" button on the display screen illustrated in FIG. 4B allows the user to register, with a date displayed in the calendar view, information of an event held on this date.

Figure 5A:
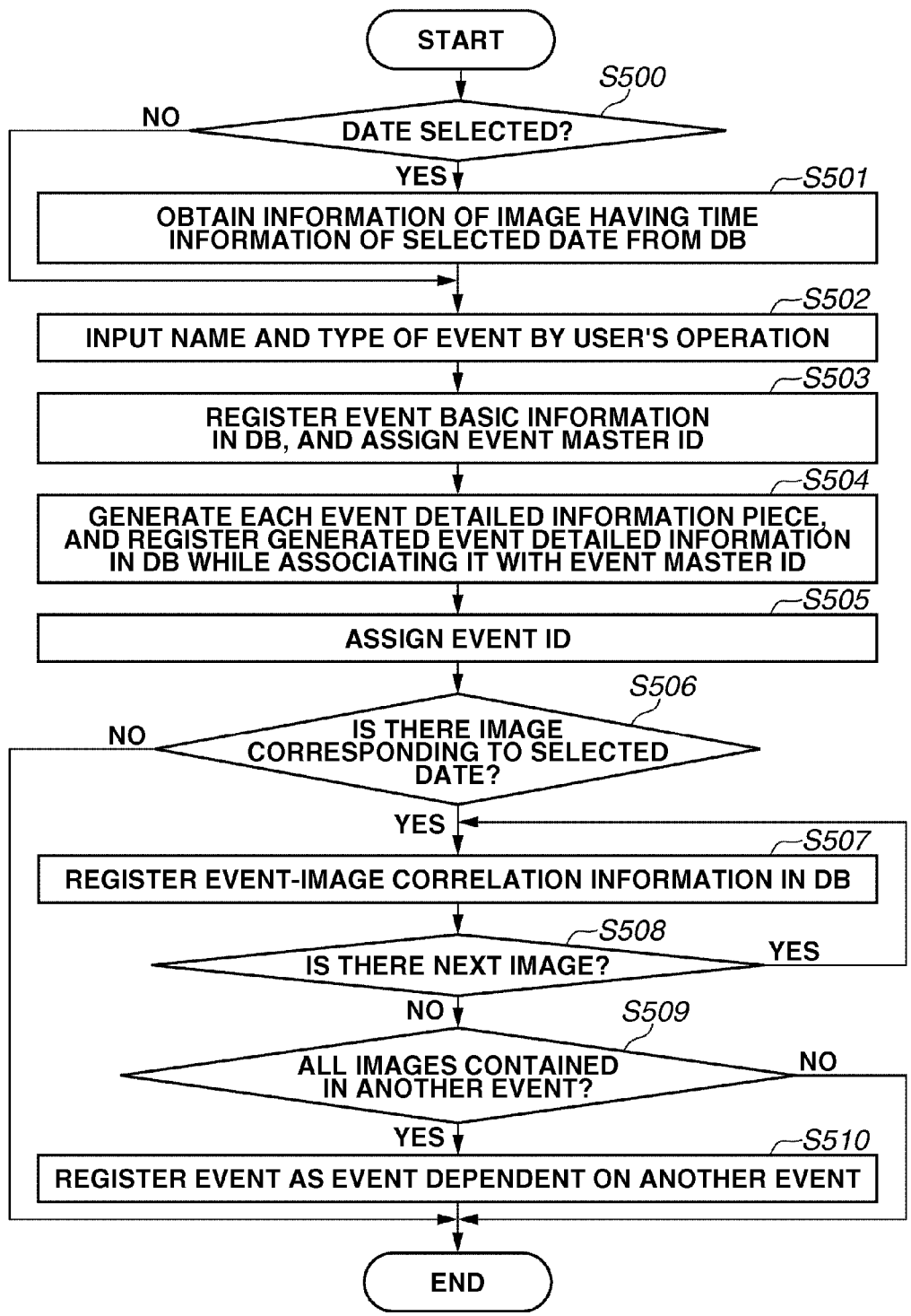
Figure 5B:
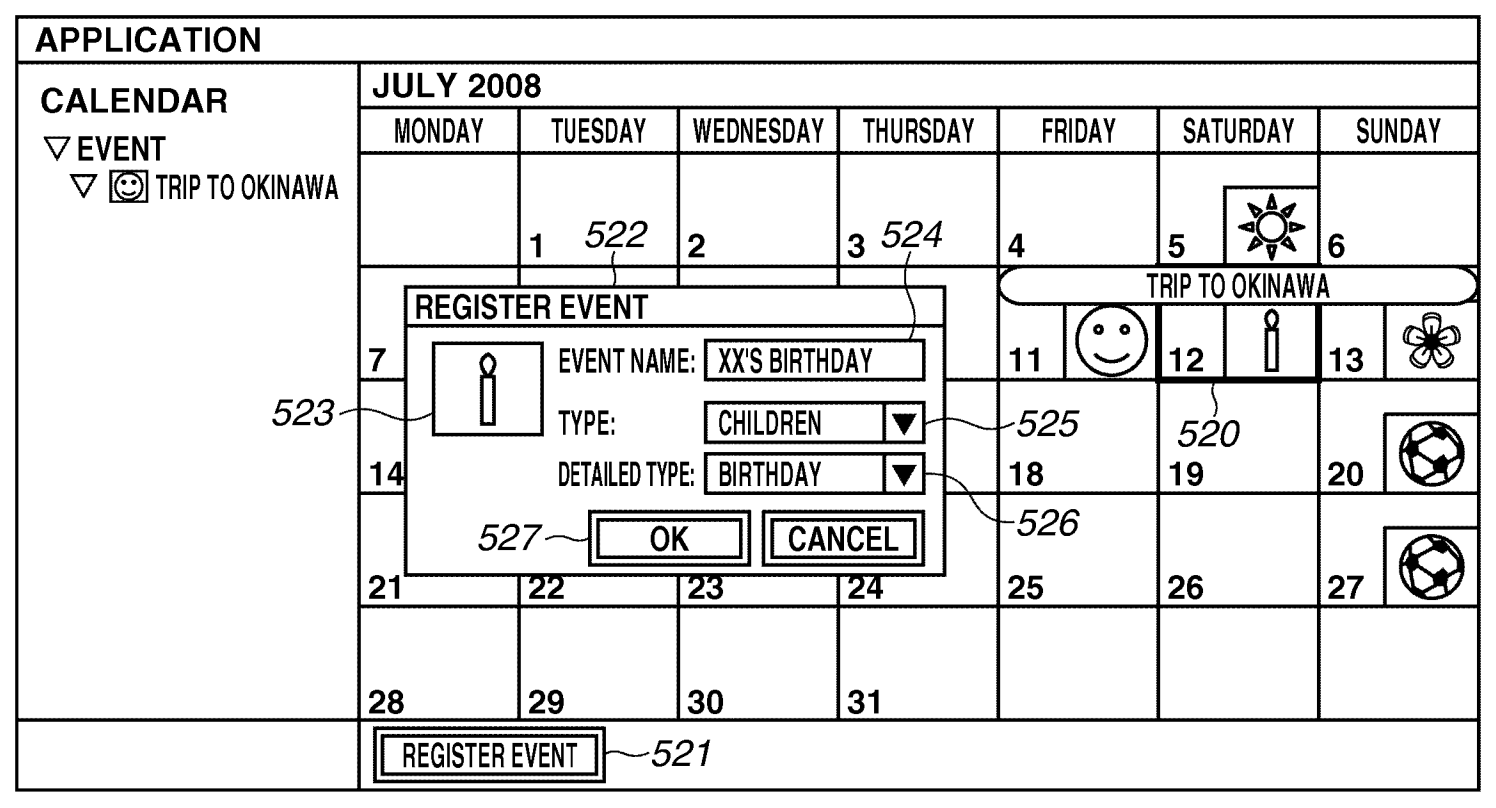

FIGS. 5A and 5B illustrate event registration processing. FIG. 5A is a flowchart illustrating a processing procedure of the event registration processing. FIG. 5B is a display screen of the application 101 during the event registration processing. A user can issue various kinds of instructions such as a selection of a button on display screens illustrated in FIG. 5B, and FIGS. 6A, 6B, and 6C to 8A, 8B, 8C, and 8D which will be described below, and the user issues these instructions by operating the operation device. The operation device may be embodied by any of various kinds of devices such as a mouse, a keyboard, and a touch panel.

When the user designates the event registration button 521 on the display screen of the application 101, the user's instruction to generate an event is input into the application 101, and then the application 101 starts the processing illustrated in FIG. 5A. In step S500, the application 101 determines whether the event registration button 521 is designated with a date area 520 selected by the user through, for example, a mouse operation. If the application 101 determines in step S500 that the event registration button 521 is specified while the date area 520 is not selected (NO in step S500), the processing proceeds to step S502.

On the other hand, if the application 101 determines in step S500 that the event registration button 521 is designated with the date area 520 (for example, Jul. 12, 2008) selected by the user (YES in step S500), the processing proceeds to step S501. In step S501, the application 101 obtains the content information 219 corresponding to the time information of the date selected by the user from the DB 109. Further, in step S501, the application 101 indentifies the content information 219 having a smallest content ID 220 among the content information pieces 219 corresponding to the selected date, and selects the image corresponding to the identified content information 219 as a representative image of the event.

In step S502, the application 101 inputs the event name and the event type designated according to a user's instruction. More specifically, when the user presses the event registration button 521 on the display screen illustrated in FIG. 5B, the user's instruction to generate an event is input into the application 101, and an event registration window 522 is displayed. Then, an event name, an event type, and an event detailed type are selected according to user's instructions issued in an event name selection field 524, a type selection field 525, and a detailed type selection field 526 in the event registration window 522. Then, when the user designates an OK button 527, the event name, the event type, and the event detailed type specified by the user are finalized as information to be registered as the event basic information 204 illustrated in FIGS. 2A and 2B.

In a case where the application 101 identifies an image corresponding to the selected date in step S501, the application 101 displays a thumbnail image of a representative image corresponding to this selected date in the event registration window 522.

In step S503, the application 101 registers the event basic information 204 corresponding to the event name, the event type, and the event detailed type input in step S502, in the DB 109. Further, the application 101 assigns an event master ID 205 to this event basic information 204.

In step S504, the application 101 generates the event detailed information 209 corresponding to the event basic information 204 registered in step S503. At this time, in a case where the application 101 determines in step S500 that a date is selected, the application 101 registers the information in the DB 109 while setting the information of the selected date as the start time 212 and the end time 213, and setting an event master ID 211. In a case where the application 101 determines in step S500 that date is not selected, the application 101 registers the event detailed information 209 as an event that does not have an event occurrence period. In a case where a plurality of discontinuous periods is selected for the event, the application 101 generates the event detailed information 209 corresponding to each of the plurality of periods.

In step S505, the application 101 assigns an event ID 210 to each of the event detailed information piece(s) 209 generated in step S504. In step S506, the application 101 determines whether the application 101 identified an image having time information corresponding to the selected date in step S501.

If the application 101 determines in step S506 that the application identified an image corresponding to the selected date (YES in step S506), the processing proceeds to step S507. In step S507, the application 101 registers the correlation information 200 illustrated in FIGS. 2A and 2B. More specifically, the application 101 identifies the event master ID 205 assigned in step S503, and the content ID 220 contained in the content information 219 obtained in step S501. Then, the application 101 determines a correlation information ID 201 unique throughout the DB 109, and registers the correlation information 200 containing the correlation information ID 201, the event master ID 202, and the content ID 203 in the DB 109.

On the other hand, if the application 101 determines in step S506 that the application 101 could not identify an image corresponding to the selected date (NO in step S506), the application 101 ends the processing without performing processes in steps S507 to S510 for associating an image with the event.

In step S508, the application 101 determines whether there is an image corresponding to the selected date specified by the user, i.e., there is another image that is to be associated with the present target event. If the application 101 determines in step S508 that there is another image (YES in step S508), the processing proceeds to step S507 again, in which the application 101 repeats the process for associating an image with the event. On the other hand, if the application 101 determines in step S508 that there is no other image (NO in step S508), the processing proceeds to step S509.

In step S509, the application 101 determines whether all of the image(s) associated with the present target event in step S507 are contained in another event that already exists. If the application 101 determines in step S509 that not all of the image(s) associated with the present target event are contained in another event (NO in step S509), the application 101 ends the processing.

On the other hand, if the application 101 determines in step S509 that all of the image(s) associated with the present target event are contained in another event (YES in step S509), in step S510, the application 101 registers the present target event in DB 109 as an event dependent on the other image. More specifically, the application 101 registers the event master ID of the present target event as the child event master ID 232, and registers the event master ID of the other event as the parent event master ID 231 in the DB 109. Then, the application 101 ends the processing.

As a result of the execution of the above-described processing illustrated in FIGS. 5A and 5B, the event of the event name and the event type selected by the user in the calendar view is registered in the DB 109. More specifically, the event basic information 204 and the event detailed information 209 illustrated in FIGS. 2A and 2B are generated in the DB 109. Further, the user can specify the date when the event was held, and register this event period in the event detailed information 209. Further, if there is an image having time information corresponding to the date designated by the user in the calendar view, the correlation information 200 for associating the event designated to be generated by the user with the image corresponding to the date of this event is registered in the DB 109.

In the example illustrated in FIGS. 5A and 5B, the user designates a date for which a representative image is displayed as an event period. However, the user can designate even a date for which an image is not yet shot, and a representative image is not displayed. For example, the user can register even a future date from the current time as a date where an event is scheduled to be held.

Further, the user can designate not only a period constituted by consecutive dates but also a plurality of inconsecutive dates as an event period. For example, a selection item "SPECIFIC DAY OF THE WEEK EVERY WEEK" may be provided in the event registration window 522, and a specific day of the week may be set as an event period when this selection item is designated.

Next, processing for displaying the information indicating the event registered by the event registration processing illustrated in FIGS. 5A and 5B in the calendar view will be described.

Figure 6A:
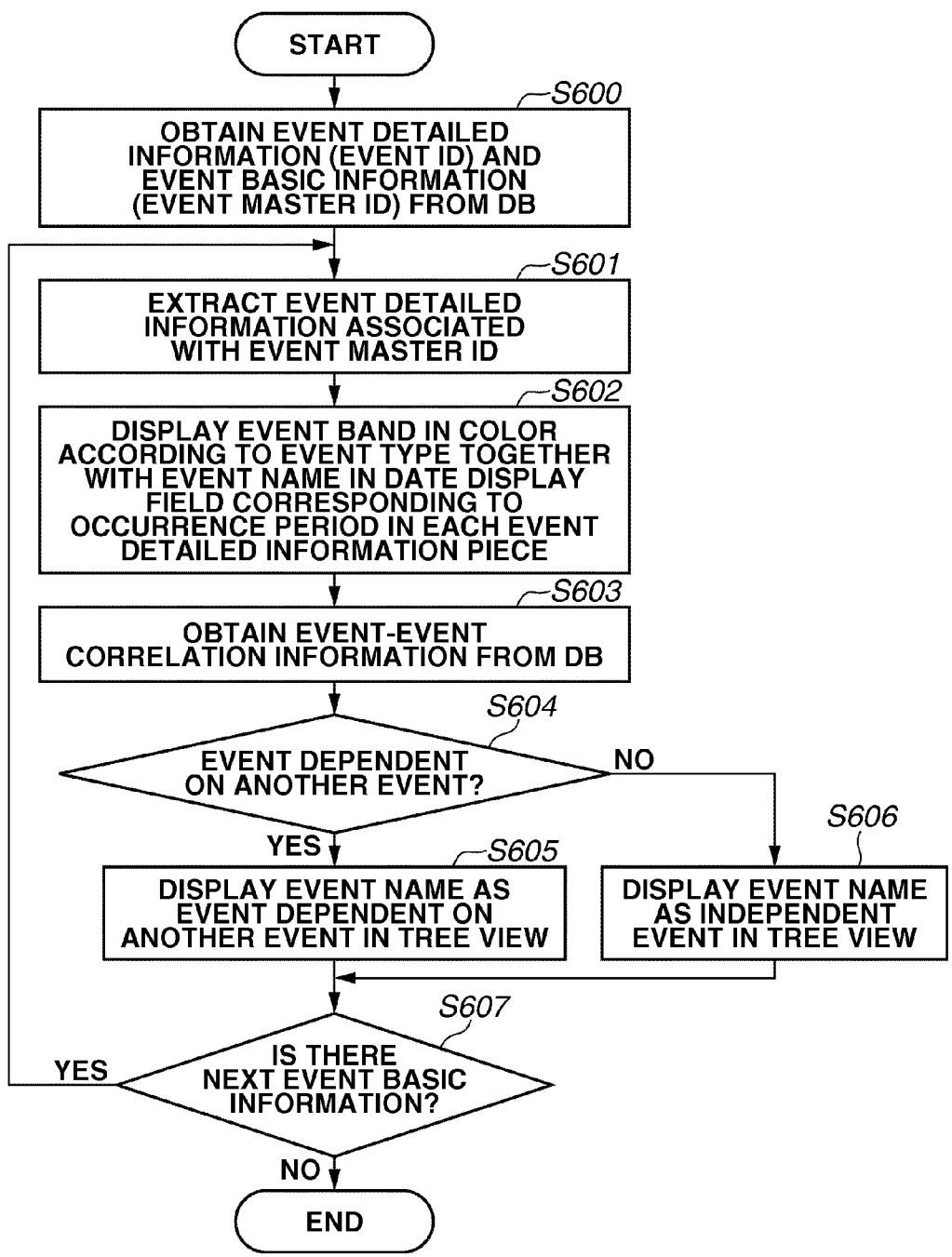

FIGS. 6A to 6C illustrate display control processing of event information, and a display screen where the event information is displayed, respectively. The event information illustrated in FIGS. 6A to 6C indicates the event name selection field 524 designated by the user in the event registration window 522 illustrated in FIG. 5B, and the date selected by the user for this event. The processing illustrated in FIGS. 6A to 6C is performed when an event is registered in the processing illustrated in FIGS. 5A and 5B, or a user issues an instruction to display the calendar view.

In step S600, the application 101 obtains the event basic information 204 and the event detailed information 209 stored in the DB 109. In step S601, the application 101 identifies one of the event basic information pieces 204 obtained in step S600, and identifies the event detailed information 209 having the event master ID 205 contained in the identified event basic information 204.

In step S602, the application 101 identifies the occurrence period information held by each event detailed information piece 209, i.e., the start time 212 and the end time 213, and displays an event band 620 in the date display field corresponding to the event occurrence period in the calendar view. The event band 620 indicates an event registered with a single date. In a case where a plurality of consecutive dates is designated, the event band 620 is displayed in the date fields of this plurality of dates. On the other hand, in a case where a plurality of inconsecutive dates is specified, an event band 621 is displayed in the date field of each of the plurality of dates. Further, an event name registered by a user is displayed on the event band 620, 621. Further, the event band 620, 621 is displayed in a color according to the event type for allowing the event type to be distinguished. In step S602, the application 101 checks whether the occurrence period of the present target event matches the display target year and month. If the occurrence period of the present target event does not match the display target year and month, the application 101 does not display the event band 620, 621 for the present target event.

In step S603, the application 101 obtains the event-event correlation information 230 stored in the DB 109. In step S604, the application 101 refers to the event-event correlation information 230 obtained in step S603, and determines whether the present target event is an event (a child event) dependent on another event. The application 101 makes this determination by determining whether the event master ID 205 contained in the event basic information 204 of the present target event is contained in the event-event correlation information 230 as the child master ID 232. If the present target event is an event dependent on another event (YES in S604), the processing proceeds to step S605. If the present target event is not a dependent event (NO in step S604), the processing proceeds to step S606.

In step S605, the application 101 displays the event name of the present target event in the tree view as a dependent event. For example, assume that the event of the event band 620 is an event dependent on "TRIP TO OKINAWA". In this case, the application 101 displays an event name 622 on the tree menu illustrated in FIG. 6B so as to indicate that this event is dependent on the event "TRIP TO OKINAWA". Further, in the calendar view, the application 101 displays this event in such a manner that the presence of a dependent relationship is recognizable as illustrated in FIG. 6C.

On the other hand, in step S606, the present target event is an independent event, and in this case, the application 101 displays an event name 623 of the present target event on the tree menu as an independent event.

In step S607, the application 101 determines whether there is next event basic information 204, i.e., all of the event basic information pieces 204 in the DB 109 have been processed. If there is a next processing target event (YES in step S607), the processing proceeds to step S601 again. If there is no next event (NO in step S607), the application 101 ends the event display processing.

In this manner, according to the processing illustrated in FIGS. 6A to 6C, an event name registered by a user is displayed on the event band. Further, the event band is displayed at the event occurrence period. Further, the event band is displayed in a color according to the event type, whereby the user can confirm the event name, the event type, and the occurrence period by viewing the display by the processing illustrated in FIGS. 6A to 6C.

Further, according to the processing illustrated in FIGS. 6A to 6C, the event band is displayed so as to indicate a continuous event held at a plurality of consecutive dates. Therefore, it is possible to indicate that images shot on this plurality of consecutive dates is a group of photos shot during a continuous event such as a trip held across the plurality of dates. Alternatively, the event band is displayed so as to indicate an event discontinuously held on a plurality of dates. Therefore, for a periodically held event such as a child's soccer class held every Sunday, it is possible to indicate that a group of photos shot every Sunday is a group of photos shot at this soccer class.

Further, it is possible to indicate a dependent relationship between events with use of the tree view display. Therefore, in a case where an event further occurs during a certain event, for example, in a case where someone's birthday came during a trip and a birthday celebration party was held at the trip destination, it is possible to make the user recognize that the image of the birthday during the trip is a photo of the birthday celebration party.

Figure 7B:
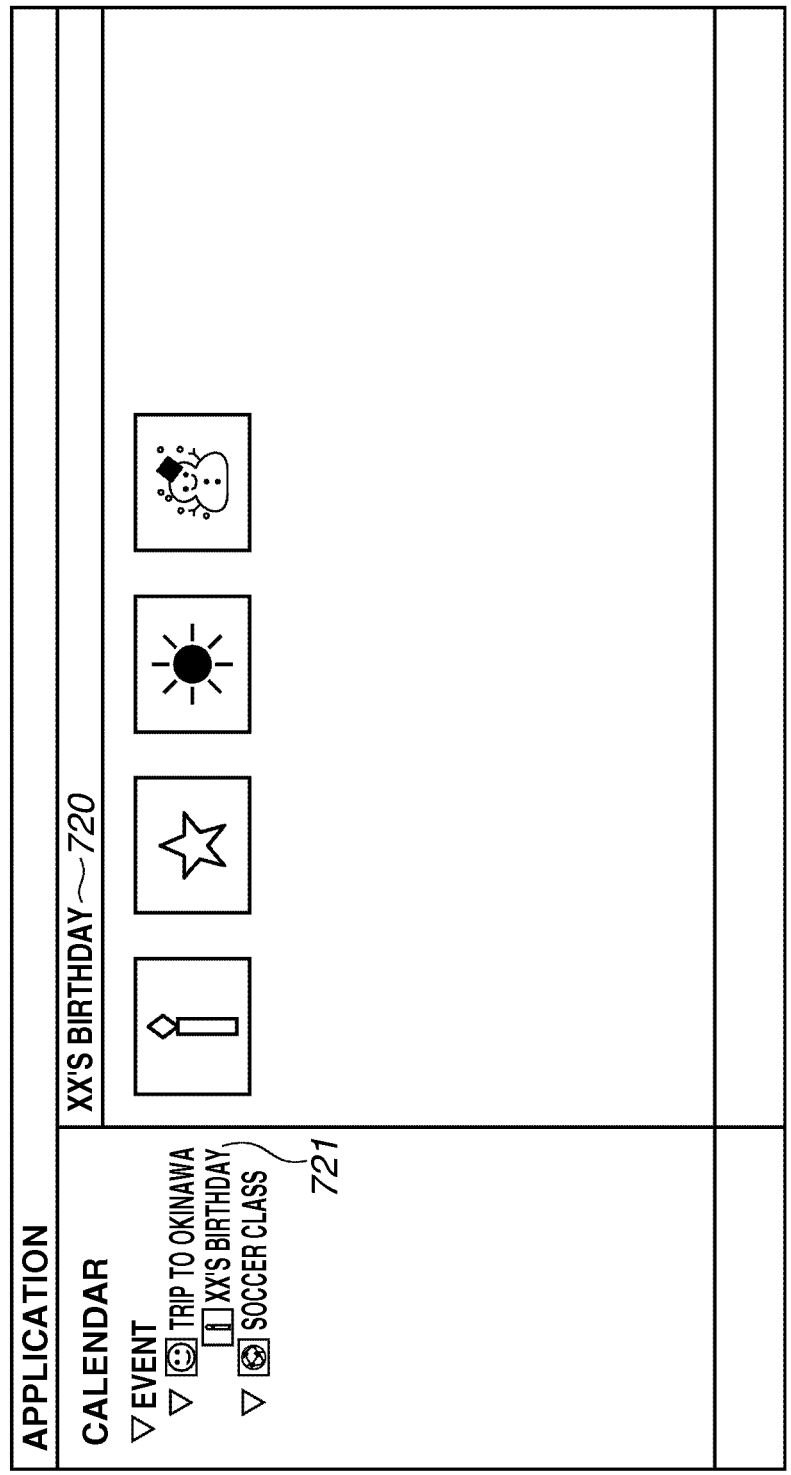

FIGS. 7A and 7B illustrate display control processing for displaying images corresponding to an event designated by a user, and a result of the display of the images corresponding to the event, respectively. This processing is performed while event bands are displayed in the calendar view, as illustrated in FIG. 6B.

In step S700, the application 101 checks whether an event is selected by a user. The user selects an event by designating an event period (an event band) or designating an event name on the tree menu. If the application 101 determines in step S700 that an event is selected (YES in step S700), the processing proceeds to step S701. In step S701, the application 101 obtains the event-image correlation information 200 from the DB 109.

In step S702, the application 101 identifies the event master ID 202 of the event selected by the user in step S700, based on the event detailed information 209. Then, the application 101 extracts the content IDs 203 associated with the identified event master ID 202 in the correlation information 200.

In step S703, the application 101 obtains the content information 219 having the content ID 203 extracted in step S702 from the DB 109. In step S704, the application 101 accesses the HDD 105 based on the folder path 223 and the filename 222 contained in the content information 219 obtained in step S703, and obtains the image corresponding to this content information 219. Then, the application 101 displays the obtained image in an event view 720 illustrated in FIG. 7B.

At this time, because the calendar view illustrated in FIG. 6B is displayed when step S700 is performed, the screen is switched to the display state illustrated in FIG. 7B by the display processing illustrated in FIG. 7A. Only the representative image of each date is displayed in the calendar view, but a plurality of images relating to an event can be displayed as a list thereof in the event view 720 illustrated in FIG. 7B.

Further, in the display illustrated in FIG. 7B, the application 101 changes a display of an event name 721 on the tree menu so as to indicate that this event is selected. Further, in the display state illustrated in FIG. 7B, the application 101 may display the shooting date and the shooting time of each image based on the image information.

In step S705, the application 101 determines whether there is a next display target image. The application 101 makes this determination by checking whether the processes of steps S703 and S704 have been performed on all of the content IDs 203 obtained in step S702. If the application 101 determines in step S705 that there is a next display target image (YES in step S705), the processing proceeds to step S703 again, from which the application 101 continues the image display processing based on the content ID 203 of the next display target image. The execution of the processes of S702 to S705 results in a display of images corresponding to the event selected by the user in the event view 720.

In a case where there are a large number of images corresponding to the event, the images are displayed across a plurality of pages in the event view 720. In other words, a part of the images corresponding to the event is displayed in the event view 720, and images contained in the next page are displayed according to a user's instruction to display the next page. Alternatively, instead of separately displaying the images across a plurality of pages, the images may be displayed in such a manner that all of the images corresponding to the event can be displayed according to a user's scrolling instruction.

Further, in the event view 720 illustrated in FIG. 7B, the user can add or delete an image to be associated with an event. The event view 720 may be configured in such a manner that, in a case where an image corresponding to a dependent event (a child event) is displayed, deletion of the image also causes deletion of this image from images corresponding to the parent event, or the image is deleted from only from the child event without being deleted from the parent event. Further, the event view 720 may be configured in such a manner that deletion of all images contained in a dependent event automatically cause deletion of the dependent event itself.

In this manner, when the user specifies an event period (an event band) in the display screen illustrated in FIG. 6B, in step S702, the application 101 identifies the event (the event master ID 211) corresponding to this event period from the event detailed information 209. Then, the application 101 identifies the images corresponding to this event from the correlation information 200 as display targets, and displays the images in the event view, as illustrated in FIG. 7B. Therefore, by checking dates of event bands displayed in the calendar view and selecting a desired event, the user can cause the images corresponding to this event to be displayed.

FIGS. 8A to 8D illustrate processing for changing an event period. In the present exemplary embodiment, changing the period corresponding to an event band by a user's operation in the calendar view leads to changes in the occurrence period information of this event and the image associated with the event.

For example, "SOCCER CLASS" events 820 and 823 illustrated in FIG. 8B are registered with Jul. 20, 2008 and Jul. 27, 2008 as discontinuous same events, respectively. The present processing will be described based on such an example that the soccer class, which is usually held on, for example, every Sunday, had a special training camp from July 21 to July 26, and a user associates an image shot during this period with the event. FIG. 8A is a flowchart illustrating the processing for changing an event period. When the user moves a mouse cursor to a right end area 821 in the event band 820, a double-headed cursor 822 is displayed, and the application 101 starts the processing illustrated in FIG. 8A.

In step S800, the application 101 identifies a processing target event band on which the event period change processing is performed according to user's pressing of a mouse button. More specifically, the application 101 identifies the event detailed information 209 corresponding to the event band 820 designated by the user among the event detailed information pieces 209 stored in the DB 109, and the event basic information 204 of the event band 820 specified by the user. In step S800, when the user performs a drag operation with the processing target event specified by the user, the application 101 specifies the position of the mouse cursor 822 in the calendar view during the drag operation. Then, the event band 820 is extended to the position of the mouse cursor 822, following the position of the mouse cursor 822, as illustrated in FIG. 8C. In step S801, the application 101 determines whether a Mouse-Up event (an event corresponding to a position where the mouse button is released from the depression) is detected. If the application 101 determines in step S801 that a Mouse-Up event is detected (YES in step S801), the application 101 assumes that the user's operation performed on the event band 820 is finished, and in step S802, the application 101 determines whether the event period is changed from the event period of the event identified in step S800.

If the application 101 determines in step S802 that the event period is changed (YES in step S802), in step S803, the application 101 updates the event-image correlation information 200. More specifically, in a case where there is a date newly contained in the event period according the change in the event period, the application 101 generates the correlation information 200 containing the content ID 203 of an image corresponding to this date and the event master ID 202 of the changed event, and registers the generated correlation information 200 in the DB 109. Further, in a case where there is a date removed from the event period according to the change in the event period, the application 109 deletes the correlation information 200 between an image corresponding to the removed date and the currently processed event from the DB 109.

Next, in step S804, the application 101 determines whether the event band 820 with the event period changed overlaps another event band corresponding to the same event master ID 211 as this event band 820. More specifically, when the mouse cursor 822 illustrated in FIG. 8C moves to the position where another event band 823 is displayed, the application 101 compares the event master IDs 211 in the event detailed information pieces 209 corresponding to the respective two event bands 820 and 823. Then, if the event master IDs 211 of the two event bands 820 and 823 coincide with each other, the application 101 determines that the event bands 820 and 823 overlap each other.

If the application 101 determines in step S804 that there is no overlap between event bands (NO in step S804), in step S806, the application 101 changes the event occurrence period, i.e., the start time 212 and the end time 213 in the event detailed information 209 stored in the DB 109.

On the other hand, if the application 101 determines in step S804 that there is an overlap between event bands (YES in step S804), in step S805, the application 101 changes the start time 212 and the end time 213 in the event detailed information 209, and at the same time, deletes the event detailed information 209 of the event band 823, which the event band 820 overlaps, from the DB 109.

In step S807, the application 101 updates the display of the event band 820 based on the event detailed information 209 updated in step S805 or step S806.

In this manner, according to the processing illustrated in FIGS. 8A to 8D, the user can instruct the application 101 to extend or shorten an event period, and update the event detailed information 209 thereof by designating an event band in the calendar view and performing a drag operation.

Further, when the event detailed information 209 is updated, the display of the event band can be also updated. For example, as illustrated in FIG. 8C, when the mouse cursor 822 is located in the date field of Jul. 24, 2008, detecting the completion of a drag operation in step S801 leads to a display of the event band 820. At this time, the event occurrence period is changed to a period from Jul. 20, 2008 to Jul. 24, 2008. Further, the execution of the process in step S803 results in the establishment of new associations between images that exit in a period from Jul. 21, 2008 to Jul. 24, 2008 and the "SOCCER CLASS" event, and the generation of the correlation information 200 corresponding to each of the images.

Further, when the completion of the drag operation is detected in step S801 with the mouse cursor 822 moved to Jul. 27, 2008, the event occurrence period is changed to a period from Jul. 20, 2008 to Jul. 27, 2008. Further, an event band 824 is displayed according to the changed event period. Therefore, the user can understand that the event band 823 originally displayed in the date field of Jul. 27, 2008 in FIG. 8B is integrated to the event band 820 displayed in the date field of Jul. 20, 2008, forming the single event band 824 illustrated in FIG. 8D. Further, at this time, the application 101 newly associates images that exist in a period from Jul. 21, 2008 to Jul. 26, 2008 with the "SOCCER CLASS" event, and generates the correlation information 200 corresponding to each of the images. In addition thereto, in step S805, the application 101 deletes the event detailed information 209 corresponding to the event band 823.

The processing for extending or shortening an event period has been described in the description of the example illustrated in FIGS. 8A to 8D. However, the present exemplary embodiment is not limited thereto, and may be configured in such a manner that both the start time and the end time of an event period can be collectively changed. For example, an event band is displaced in the calendar view according a user's drag operation, and the date corresponding to the displaced event band is set as the changed event period.

In this way, according to the present exemplary embodiment, an event band corresponding to a date is displayed in the calendar view. Then, when the user designates an event period (an event band), the event corresponding to the designated event period is identified, and an image corresponding to the identified event can be displayed. Therefore, by designating a desired date when an event was held, the user can cause an image shot at this event to be displayed.

According to the present exemplary embodiment, in a date field of a date when an image was shot, the image shot on this date is displayed. However, an event band is displayed separately from the image. Therefore, even if there is no image shot on a date with which an event is registered, as long as the date is a date corresponding to the event, an event band is displayed in the date field of this date. FIG. 9 illustrates an example of the calendar view. As illustrated in FIG. 9, it can be understood that no image was shot on July 13 and July 27, but events are registered with these dates.

Therefore, even for a date when an image was not shot during an event, a user can cause a list of images corresponding to the event to be displayed by designating the event band of this date. For example, for a future date from the current date and time, no image is displayed because there is no image shot on this date. However, according to the present exemplary embodiment, it is possible to display an image shot at an event held in the past by selecting the event band of the event registered as a plan by a user with the future date from the current date. For example, in a case where "SOCCER CLASS", which is a periodic event held every week, is registered as a plan, it is possible to easily display an image shot in a previous soccer class by selecting the event band.

Further, the present exemplary embodiment has been described based on the example that categorizes images and registers events on the basis of the date, manages periods corresponding to the events on the basis of the date, and displays an image and an event band in a display area on the basis of the date (a date field). However, the present exemplary embodiment is not limited thereto, and can be employed even in a case where an image and an event band are displayed in a display area on the basis of year, month, time, or a combination of this plurality of types.

Further, in the above-described exemplary embodiment, an image associated with the period of an event is handled as an image shot at this event. However, an event may be identified based on the shooting site where the image was shot, in addition to the date. The shooting site of an image can be specified from position information added to an image file by a shooting apparatus when the image was shot.

Then, if a plurality of events is registered with a same date by a user, images are categorized by the event based on the shooting sites of the images, and the categorized image groups are associated with the events. At this time, an image group designated according to a user's instruction is associated with an event specified by the user. Further, if shooting sites of the image groups shot on the same date have a distance within a predetermined distance, some event among the plurality of events registered by the user is set as an event dependent on another event. At this time, if the event periods of the plurality of events are different, an event having a shorter event period than another event is set as an event dependent on the event having a longer event period.

Further, in addition to the shooting sites of images, face regions contained in the images may be further specified, and the images may be categorized by the event based on the features of these regions. For example, if the application 101 determines that a same person is contained in a plurality of images based on the feature amount of a face contained in each of the plurality of images, the application 101 may determine that the plurality of images correspond to a same event even if the application 101 determines that the shooting sites are different.

Further, the above-described exemplary embodiment has been described based on the example in which the processing target content is an image. However, the processing target content may be any of various kinds of data such as a moving image, a diary, and text data such as a blog. Further, the above-described exemplary embodiment has been described based on the example that uses an event held when an image was shot as information indicating a condition when the content was generated. However, the present exemplary embodiment is not limited thereto. For example, the model of a camera used to shoot an image when the image was shot, or the shooting site of an image may be registered as this information. Alternatively, a user who shot an image may be registered as this information. Alternatively, the user ID of a user who generated a blog or a diary may be registered as this information.

Further, the above-described exemplary embodiment has been described based on the example in which the application 101 displays the calendar view. However, the above-described exemplary embodiment may be used even in a case where the application 101 displays event information on a calendar view displayed by another application. For example, an event band according to the above-described exemplary embodiment may be displayed by causing a program having the function of the application 101 to work as plug-in software on an application that displays a calendar view. The plug-in software obtains an image of a calendar view with images categorized by the date, and displays event bands on this calendar view. Then, when a user selects an event band, the plug-in software may display an image corresponding to this event band.

Further, the above-described exemplary embodiment has been described based on the example that displays an image corresponding to an event designated by a user on the display device. However, the image output method is not limited to such a display, and may be embodied by any of various kinds of output methods such as printing by a printing apparatus, transmission to an external apparatus, and storage into a memory.

The above-described exemplary embodiment manages images based on the information indicating a date such as a date when an image was shot and a date when an event is held. However, the above-described exemplary embodiment is not limited thereto, and may manage images in consideration of both dates and times, and display an image so as to indicate the time corresponding to the event or the image. Alternatively, the above-described exemplary embodiment may manage images according to only times. For example, the above-described exemplary embodiment may manage images based on the shooting times of the images. In a case where an event designated by a user is, for example, an event held at night, the above-described exemplary embodiment identifies images shot at times at night and displays a list of the images.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the present invention may be embodied by an embodiment that executes a program code for realizing the function of the above-described exemplary embodiment with use of a single computer (a CPU or a micro processing unit (MPU)), or an embodiment that executes the program code through cooperation among a plurality of computers. Further, the present invention may be embodied by an embodiment that executes the program code by a computer or may be embodied by an embodiment that includes hardware such as a circuit for realizing the function of the program code. Alternatively, the present invention may be embodied by an embodiment in which a part of the program code is realized by hardware, and a program corresponding to the rest portion is executed by a computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-153673 filed Jul. 9, 2012, which is hereby incorporated by reference herein in its entirety.

What is claimed is:

1. An apparatus comprising:
a memory configured to store at least one program; and
at least one processor configured to execute the at least one program stored in the memory to perform:
registering an event corresponding to one or more dates, and one or more contents corresponding to the event;
displaying, by the at least one processor, calendar information indicating a plurality of dates and a plurality of events, on a display device, wherein each of the plurality of events individually corresponds to the one or more dates and the one or more contents, by the registering;
specifying, by the at least one processor, the event among the plurality of events, based on a user designation on the displayed calendar information; and
displaying on the display device, by the at least one processor, the one or more contents corresponding to the specified event,
wherein, when a predetermined content is registered for a first event corresponding to a single date and a second event is registered for the single date after the registration of the first event, the at least one processor registers the predetermined content automatically for the second event, and then, the at least one processor deletes the predetermined content from one or more contents registered for the second event, in accordance with a predetermined instruction performed by the user on the display device, in a first case where the predetermined content is registered for the second event, the at least one processor displays the predetermined content if any of the first event and the second event is specified, and in a second case where the predetermined content is not registered for the second event, the at least one processor does not display the predetermined content if the second event is specified.

2. The apparatus according to claim 1, wherein the at least one processor stores event information for specifying an event and content information for specifying the one or more contents corresponding to the event, on a database, and wherein the at least one processor specifies the event based on an instruction by the user and the event information, and displays the one or more contents based on the specified event and the content information.

3. The apparatus according to claim 1, wherein the at least one processor, based on time information corresponding to a content, further displays the content in a date in the calendar information.

4. The apparatus according to claim 3, wherein in the calendar information, a single event corresponding to a plurality of separate dates, is indicated in each of the plurality of separate dates, and in a case where the single event is specified based on a user designation of a first date among the plurality of separate dates, a content which is displayed in a second date in the plurality of separate dates, is displayed, even if the first date is a separate date in which no content is displayed.

5. The apparatus according to claim 4, wherein the first date is a future date which is a date occurring subsequent to a current date.

6. The apparatus according to claim 3, wherein if a single date includes at least two contents, a content selected to be displayed on the display device from the at least two contents is a content having a smallest quantity of data.

7. The apparatus according to claim 1, wherein the at least one processor, according to a user's instruction, changes the one or more dates corresponding to the event.

8. The apparatus according to claim 1, wherein each of the one or more contents is an image.

9. The apparatus according to claim 1, wherein in a case where a third event corresponds to all contents which correspond to a fourth event, the at least one processor displays the calendar information indicating that the fourth event is a dependent event dependent on the third event.

10. The apparatus according to claim 1, wherein the at least one processor deletes the predetermined content from the one or more contents registered for the second event, in accordance with the predetermined instruction by the user on the display device displaying the one or more contents registered for the second event.

11. A method performed by at least one processor by executing at least one program stored in a memory, the method comprising:

registering an event corresponding to one or more dates, and one or more contents corresponding to the event;

displaying by the at least one processor, calendar information indicating a plurality of dates and a plurality of events, on a display device, wherein each of the plurality of events individually corresponds to the one or more dates and the one or more contents, by the registering;

specifying, by the at least one processor, the event among the plurality of events, based on a user designation on the displayed calendar information; and displaying, by the at least one processor, the one or more contents corresponding to the specified event, wherein, when a predetermined content is registered for a first event corresponding to a single date and a second event is registered for the single date after the registration of the first event, the at least one processor registers the predetermined content automatically for the second event, and then, the at least one processor deletes the predetermined content from one or more contents registered for the second event, in accordance with a predetermined instruction performed by the user on the display device, in a first case where the predetermined content is registered for the second event, the predetermined content is displayed if any of the first event and the second event is specified, and in a second case where the predetermined content is not registered for the second event, the predetermined content is not displayed if the second event is specified.

12. The method according to claim 10, wherein the at least one processor stores event information for specifying the event corresponding to the one or more dates and content information for specifying the one or more contents corresponding to the event, on a database, and wherein the at least one processor specifies the event based on a date designated by the user and the event information, and displays the one or more contents based on the specified event and the content information.

13. The method according to claim 11, wherein the at least one processor, based on time information corresponding to a content, further displays the content in a date in the calendar information.

14. The method according to claim 13, wherein in the calendar information, a single event corresponding to a plurality of separate dates, is indicated in each of the plurality of separate dates, and in a case where the single event is specified based on a user designating a first date from the plurality of separate dates, a content which is displayed in a second date in the plurality of separate dates, is displayed, even if the first date is a separate date in which no content is displayed.

15. The method according to claim 14, wherein the first date is a future date which is a date occurring subsequent to a current date.

16. The method according to claim 11, wherein the at least one processor, according to a user's instruction, changes the one or more dates corresponding to the event.

17. The method according to claim 11, wherein each of the one or more contents is an image.

18. The method according to claim 11, wherein the at least one processor deletes the predetermined content from the one or more contents registered for the second event, in accordance with the predetermined instruction by the user on the display device displaying the one or more contents registered for the second event.

19. A non-transitory storage medium storing a program for causing at least one processor to perform a method, the method comprising:

registering an event corresponding to one or more dates, and one or more contents corresponding to the event;

displaying by the at least one processor, calendar information indicating a plurality of dates and a plurality of events, on a display device, wherein each of the plurality of events individually corresponds to the one or more dates and the one or more contents;
specifying, by the at least one processor, the event among the plurality of events, based on a user designation on the displayed calendar information; and
displaying, by the at least one processor, the one or more contents corresponding to the specified event,
wherein, if a predetermined content is registered for a first event corresponding to a single date and a second event is registered for the single date after the registration of the first event, the at least one processor registers the predetermined content automatically for the second event, and then, the at least one processor deletes the predetermined content from one or more contents registered for the second event, in accordance with a predetermined instruction performed by the user on the display device,
in a first case where the predetermined content is registered for the second event, the predetermined content is displayed if any of the first event and the second event is specified, and
in a second case where the predetermined content is not registered for the second event, the predetermined content is not displayed if the second event is specified.

* * * * *